United States Patent

[11] 3,601,979

| [72] | Inventor | Grover C. Singer<br>1234 Russell Drive, Apt. 503, Brownsville, Tex. 78520 |
|---|---|---|
| [21] | Appl. No. | 865,066 |
| [22] | Filed | Oct. 9, 1969 |
| [45] | Patented | Aug. 31, 1971 |

[54] HYDRODYNAMIC POWER CONVERTER
16 Claims, 1 Drawing Fig.

[52] U.S. Cl. .................................................. 60/6,
60/55
[51] Int. Cl. .................................................. F01b 21/00
[50] Field of Search .................................................. 60/55, 11/6, 8, 10; 91/5

[56] References Cited
UNITED STATES PATENTS

| 767,671 | 8/1904 | Wiesner .................. | 60/55 UX |
| 2,652,690 | 9/1953 | Labriola et al. .......... | 60/55 |
| 3,434,284 | 3/1969 | Siptrott .................. | 60/55 X |
| 3,303,649 | 2/1967 | Mastini .................. | 60/55 |

*Primary Examiner*—Edgar W. Geoghegan
*Attorneys*—Clarence A. O'Brien and Harvey B. Jacobson ABSTRACT: Flow of liquid and air through a closed circuit wherein the relative densities of the liquid and air causes upward movement of air bubbles through the liquid. Both the air and liquid are impelled upwardly by an auger to which torque is applied through a turbine driven power shaft. A storage tank houses a body of liquid at a predetermined level to maintain a predetermined pressure of the air injected into a gravity induced flow of liquid through the turbine.

PATENTED AUG 31 1971
3,601,979
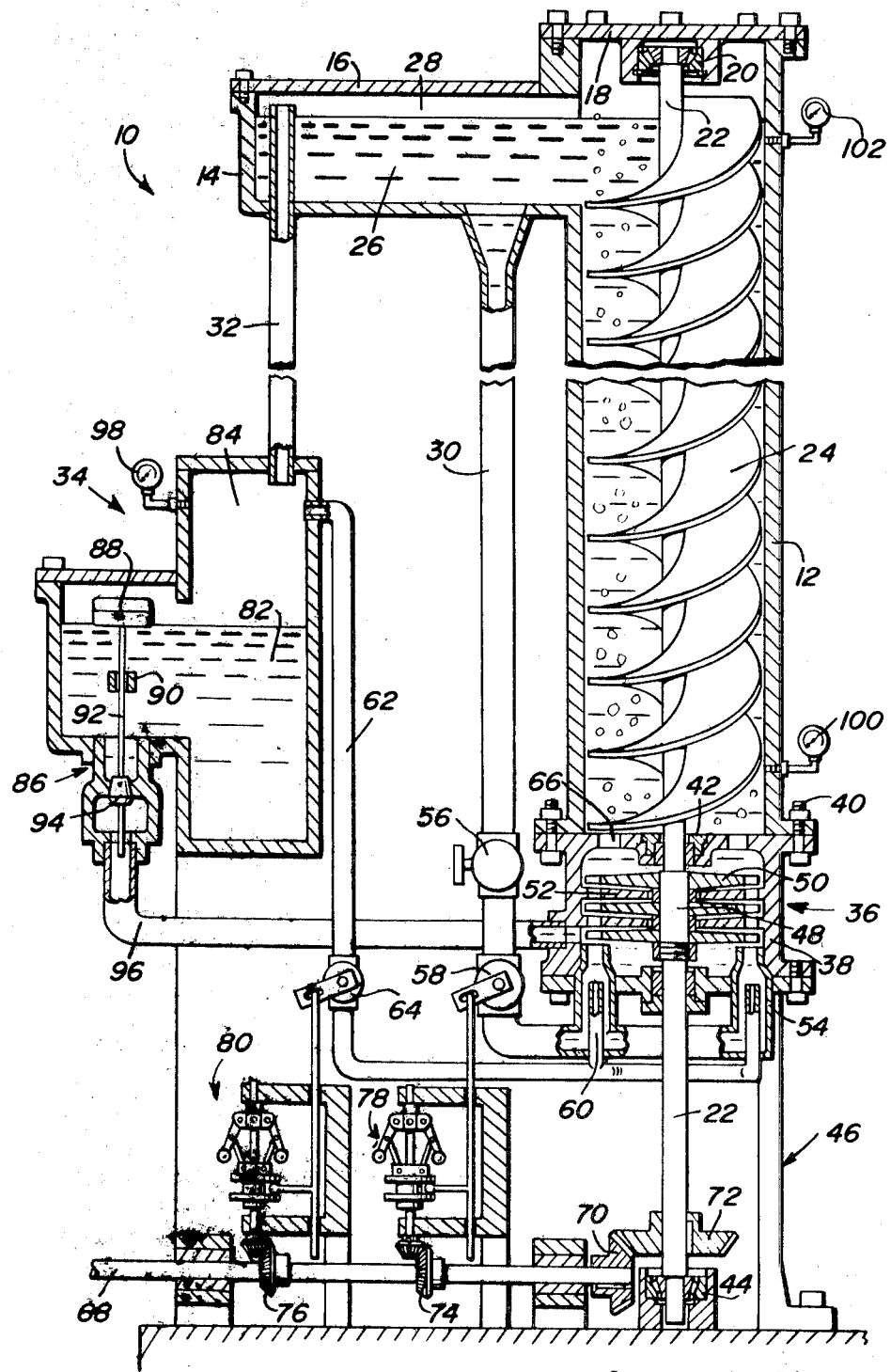
Grover C. Singer
INVENTOR.
BY Clarence A. O'Brien
and Harvey B. Jacobson
Attorneys

HYDRODYNAMIC POWER CONVERTER

This invention relates to the flow of liquid and air through a closed circuit path to convert and store energy and for other possible benefits.

An important object of the present invention is to control the flow of a liquid such as water and a gas such as air which are relatively immiscible in such a manner as to take advantage of the buoyant forces acting on the bubbles of air within the water being conveyed upwardly by means of a power driven auger to a collection chamber from which the water is recirculated under gravity feed to a turbine mounted on the power shaft.

An additional object is to further enhance operation of the turbine by injecting air under pressure into the water, the air pressure being regulated by a level control device within a water and air storage chamber through which air is recirculated from the collection chamber at the upper end of the water and air conveying mechanism.

In accordance with the present invention, an auger-type conveyor is enclosed within a vertically elongated conveyor tube connected at its upper end to a collection chamber within which water and air separates and from which the water is conducted downwardly to the lower end of the conveyor tube at which a turbine is mounted on the power shaft driving the auger mechanism. Air under pressure from a storage chamber is injected into the nozzles discharging the gravity induced flow of water into the turbine so as to convert the potential energy of the water into kinetic energy for driving the auger mechanism. The air injected into the water not only enhances operation of the turbine but also assists upward movement of the water because of the buoyancy of the air bubbles within the water. Governor mechanisms operating through flow control valves, regulate the inflow of water and air under pressure to the turbine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The drawing is a somewhat simplified vertical section view through apparatus constructed in accordance with the present invention.

Referring now to the drawing in detail, the apparatus generally denoted by reference numeral 10 includes a vertically elongated conveyor tube 12 of a predetermined cross-sectional flow area for upwardly conveying liquid and gas to a collection chamber basin 14 extending laterally from the upper end of the conveyor tube. The liquid may be water while the gas may be air which is relatively immiscible therewith. The water which is also relatively incompressible, as compared to the air, may be mixed with an antifreeze medium so that operation of the apparatus will not be adversely effected under low temperature conditions.

The top of the collection basin 14 is sealed by a lid 16 while the upper end of the conveyor tube 12 is closed by a pressure tight cover 18 mounting a bearing assembly 20 for the upper end of a vertical power shaft 22 that extends longitudinally through the conveyor tube. The power shaft mounts an auger mechanism 24 so as to upwardly impel the water and air. A body of water 26 is accordingly collected within the basin 14 below an air space 28. The water within the basin 14 is conducted downwardly under gravity induced flow through a conduit 30 smaller in diameter than conveyor tube 12. A still smaller diameter conduit 32 extends upwardly into the collection basin 14 above the level of the body of water 26 therein so as to establish fluid communication between the air space 28 and a fluid storage chamber assembly generally referred to by reference numeral 34 thereby equalizing the air pressure in the storage chamber assembly and the collection basin. The conveyor tube 12, and the conduits 30 and 32 are of substantial vertical length so as to establish a desirable height head pressure for the water supplied to a turbine assembly 36 by the conduit 30 at the lower end of the conveyor tube 12.

The turbine assembly includes a housing 38 bolted to the lower end of the conveyor tube 12 by the fastener assemblies 40. The turbine housing 38 mounts at its upper end a bearing assembly 42 through which the power shaft 22 is journaled intermediate its upper and lower ends. A bearing assembly 44 supports the power shaft at its lower end below the turbine assembly 36. The turbine assembly is supported above the lower bearing assembly 44 by any suitable supporting frame 46.

The section 48 of the power shaft within the turbine housing 38, mounts a plurality of turbine blades 50 associated with the turbine assembly and cooperating with reactor blades 52 mounted on the housing to convert the potential energy of the fluid into kinetic energy. Accordingly, fluid under pressure injected into the lower end of the turbine assembly by the water discharging nozzles 54, is operative through the turbine assembly to impart torque to the power shaft 22. The water nozzles 52 are connected to the lower end of the water conduit 30. Mounted in the water conduit adjacent to the nozzles 52, is a manually controlled shutdown valve 56 and a governor operated flow control valve 58.

Air injection nozzles 60 extend into the water nozzles 54 and are connected to the lower end of an air pressure supply tube 62. A governor operated flow control valve 64 is mounted in the air pressure supply tube so as to regulate the inflow of air injected into the water emerging from the water nozzles 54 within the turbine assembly 36. It will be apparent therefore, that a regulated flow of water and air is operative through the turbine assembly to contribute to the torque applied to the power shaft through which the auger mechanism 24 is rotated to upwardly impel the water and air discharged from the turbine assembly through outlets 66 into the lower end of the water conveyor tube 12.

Power may be supplied to the power shaft 22 through drive shaft 68 having a bevel gear 70 connected to one end thereof in mesh with a bevel gear 72 fixed to the power shaft 22 above the lower bearing assembly 44. Bevel gears 74 and 76 are also mounted on the drive shaft so as to drive the governor mechanisms 78 and 80 which respectively operate the flow control valves 58 and 64 through which water and air is fed to the turbine assembly. Thus, the inflow rate of water and air will be a function of the speed of the power shaft 22 as well as the pressure of the water and the air on the upstream sides of flow regulating valves 58 and 64. The pressure of the water will of course depend upon the height of the collection basin 14 above the turbine assembly. The pressure of the air on the other hand is regulated by the fluid storage tank housing assembly 34.

The fluid storage tank encloses a pressure sealed chamber containing a predetermined volume of water 82 above which a predetermined volume of air 84 is enclosed. The pressure of the air 84 will depend upon the level of the water maintained within the tank chamber which is controlled by a liquid level responsive device 86. The liquid level responsive device includes a float element 88 slidably mounted by the bracket 90 for vertical displacement and connected by the valve steam 92 to a valve element 94. A conduit 96 establishes fluid communication between the valve element 94 and the turbine housing 38. When the level of the water 82 within the storage tank chamber drops below a predetermined level, the float element 88 moves downwardly and opens the valve element 94. Water under the higher height head pressure of the body of water 26 flows through conduit 30 into the turbine housing 38, and then through conduit 96 into the storage chamber in order to restore the level of water 82 therein. Thus, the air 84 within the storage tank chamber is maintained at a predetermined pressure. The upper end of the air supply tube 62 is connected to the storage tank at its upper chamber portion to which the vertical conduit 32 is also connected in order to conduct only air. The air pressure within the upper chamber portion of the storage tank may be monitored by a pressure gauge 98 while pressure gauges 100 and 102 respectively gauge the pressure of the fluid adjacent the lower and upper ends of the conveyor tube 12.

It will be apparent therefore, that when torque is applied to the power shaft 22, rotation of the auger mechanism 24 is operative to upwardly convey the water and air discharged from the turbine assembly 36, to the collection basin 14 within which the air and water separates into separate bodies. The collected water then flows downwardly through the conduit 30 which is substantially smaller in diameter than the conveyor tube 12 while the air 28 flows through the conduit 32 into the storage tank assembly 34. Water under pressure dependent upon the height of the collection basin 14 above the turbine assembly is accordingly discharged by the nozzles 54 into the turbine while air under regulated pressure from the storage tank assembly is injected into this water by the air injection nozzles 60. Thus, a substantial amount of the energy of the water and air is recovered and applied to the power shaft 22 through which the auger is operative to upwardly convey the water and air discharged at a lower exhaust pressure from the upper outlet end of the turbine assembly into the lower inlet end of the conveyor tube 12. Upward movement of the water is assisted by the buoyant forces acting on the air bubbles to thereby reduce fluid losses. The apparatus may therefore operate as a fluid flywheel by means of which energy is imparted to and extracted from the power shaft 22 through the drive shaft 68. By means of the fly ball governor mechanisms 78 and 80 operating through the flow control valves 58 and 64, flow of the fluids through the closed circuit paths established by the apparatus may be regulated in accordance with the speed developed by the power shaft 22. Operation of the apparatus may be shutdown by closing the shutdown valve 56 blocking downflow of water through the conduit 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A power converter through which at least two fluids of different densities are conducted in a closed circuit comprising means for storing said fluids under pressure, power driven means for upwardly conveying said fluids, collection means connected to the power driven conveying means for receiving the fluids and recharging the storing means with the fluid of lower density, turbine means connected to the conveying means, nozzle means for discharging said fluids under pressure through the turbine means into the conveying means, and fluid supply means connected to the nozzle means for separately conducting the fluid of lower density from the storing means and the fluid of higher density from the collection means.

2. The combination of claim 1 wherein said collection means is vertically spaced above the turbine means.

3. The combination of claim 2 including speed responsive control means connected to the fluid supply means for regulating flow of said fluids to the nozzle means as a function of the speed of the power driven conveying means.

4. The combination of claim 3 wherein said storing means comprises a pressure sealed housing having a chamber occupied by the fluid of higher density below a predetermined level and by the fluid of lower density above said level, pressure regulating valve means for conducting said fluid of higher density from the turbine means to the chamber in response to a drop thereof below said level within the chamber, and means establishing fluid communication between the chamber and the collection means for equalizing the static pressure of the fluid of lower density.

5. The combination of claim 4 wherein said conveying means includes a vertical tube, a power shaft extending through the tube and auger blades mounted on the power shaft.

6. The combination of claim 5 wherein said fluid supply means includes a first conduit connected to the storing means in communication with the chamber substantially above said level and a second vertical conduit connected to the collection means in communication with the fluid of higher density.

7. The combination of claim 6 wherein said fluid of higher density is a liquid and the fluid of lower density is a gas relatively immiscible with the liquid.

8. The combination of claim 1 wherein said fluid of higher density is a liquid and the fluid of lower density is a gas relatively immiscible with the liquid.

9. The combination of claim 1 wherein said storing means comprises a pressure sealed housing having a chamber occupied by the fluid of higher density below a predetermined level and by the fluid of lower density above said level, pressure regulating valve means for conducting said fluid of higher density from the turbine means to the chamber in response to a drop thereof below said level within the chamber, and means establishing fluid communication between the chamber and the collection means for equalizing the static pressure of the fluid of lower density.

10. The combination of claim 9 wherein said fluid supply means includes a first conduit connected to the storing means in communication with the chamber substantially above said level and a second vertical conduit connected to the collection means in communication with the fluid of higher density.

11. The combination of claim 1 wherein said fluid supply means includes a first conduit connected to the storing means in communication with the collection means and a second vertical conduit connected to the collection means in communication with the fluid of higher density.

12. The combination of claim 11 including speed responsive control means connected to the fluid supply means for regulating flow of said fluids to the nozzle means as a function of the speed of the power driven conveying means.

13. The combination of claim 1 including speed responsive control means connected to the fluid supply means for regulating flow of said fluids to the nozzle means as a function of the speed of the power driven conveying means.

14. The combination of claim 1 wherein said conveying means includes a vertical tube, a power shaft extending through the tube and auger blades mounted on the power shaft.

15. A power converter through which a liquid and a gas immiscible therewith are conducted comprising collection means for receiving said liquid and gas, means for conveying a mixture of said liquid and gas upwardly to the collection means, turbine means connected to the conveying means below the collection means for operating the conveying means, and means for separately conducting the liquid and gas from the collection means to the turbine means.

16. The combination of claim 15 wherein the conducting means includes means for storing said gas under pressure and separate conduits respectively connecting the gas storing means and the collection means to the turbine means.